(12) United States Patent
Boegelund et al.

(10) Patent No.: US 7,398,214 B2
(45) Date of Patent: Jul. 8, 2008

(54) METHOD FOR TRANSLATING SLIDE PRESENTATIONS INTO DIFFERENT LANGUAGES

(75) Inventors: Flemming Boegelund, Frederikssund (DK); Debra A. Kipping, North Richland Hills, TX (US)

(73) Assignee: International Business Machines Corporation, Armonk, NY (US)

( * ) Notice: Subject to any disclaimer, the term of this patent is extended or adjusted under 35 U.S.C. 154(b) by 1221 days.

(21) Appl. No.: 09/998,043

(22) Filed: Nov. 29, 2001

(65) Prior Publication Data
US 2003/0101043 A1 May 29, 2003

(51) Int. Cl.
*G10L 11/00* (2006.01)
*G06F 17/28* (2006.01)
*G06F 17/20* (2006.01)

(52) U.S. Cl. .................. 704/277; 704/2; 704/8
(58) Field of Classification Search ............ None
See application file for complete search history.

(56) References Cited

U.S. PATENT DOCUMENTS

| | | | |
|---|---|---|---|
| 5,404,435 A * | 4/1995 | Rosenbaum | 715/515 |
| 5,416,903 A * | 5/1995 | Malcolm | 715/703 |
| 5,551,055 A * | 8/1996 | Matheny et al. | 710/62 |
| 5,583,761 A * | 12/1996 | Chou | 715/536 |
| 5,974,372 A * | 10/1999 | Barnes et al. | 704/8 |
| 6,037,943 A | 3/2000 | Crone et al. | 345/357 |
| 6,108,674 A | 8/2000 | Murakami et al. | 707/515 |
| 6,128,629 A | 10/2000 | Bretschneider et al. | 707/203 |
| 2003/0025737 A1 * | 2/2003 | Breinberg | 345/801 |

* cited by examiner

*Primary Examiner*—David R. Hudspeth
*Assistant Examiner*—Brian L Albertalli
(74) *Attorney, Agent, or Firm*—David A. Mims, Jr.; Darcell Walker (57) ABSTRACT

The present invention provides a method and system for translating presentation slides from one language to at least one additional language. In this method, text information from one slide can be extracted from a presentation slide. Addressing information contained on the slide is also extracted from the slide. This addressing information describes the location of the text on the slide. After the text information is extract from the original presentation slide, the text is inserted into an auxiliary file for the translation procedure. This auxiliary file has a format that can be readily translated using current translation techniques. However, the addressing information is transparent and write protected to the translation program and therefore will only pass through without being translated. Following the translation procedure, the addressing information is used to insert the translated text information into a presentation slide containing any objects that existed in the original slide.

18 Claims, 8 Drawing Sheets

METHOD FOR TRANSLATING SLIDE PRESENTATIONS INTO DIFFERENT LANGUAGES

FIELD OF THE INVENTION

This invention relates to a method for translating screen displays of a software application program and, more particularly, to a method for translating the text in presentation slides from its initial language into one or more different languages and displaying the presentation slides with the text in the translated language.

BACKGROUND OF THE INVENTION

Making presentations and conducting meetings are important aspects of many occupations. Executives make presentations to directors, managers conduct meetings with staff, salespersons make presentations to potential customers, doctors conduct meetings with nurses, lawyers make presentations to juries, and so on. A great many professionals conduct and attend meetings and presentations regularly. Much effort therefore goes into creating and delivering effective presentations and preparing for and conducting effective meetings.

With specialized software, conventional personal computers provide effective platforms for creating and conducting presentations and meetings. Currently available presentation program modules can turn a personal computer into a customized presentation system for creating and delivering slide presentations. Generally described, these presentation systems provide a specially designed, user-friendly, pallet of tools to assist in the creation of presentation slides to be subsequently displayed to an audience. These presentation systems also allow the slides to be sequentially presented to an audience, point-by-point and slide-by-slide, with color, animation, audio, and transition effects that enrich and enliven the presentation.

Presentations usually involve the use of visual aids such as slides. These slides contain information related to the subject of the presentation and can include text, charts, graphs and pictorial images. Many of these slides are created on computers using various computer programs. Slide presentation programs are computer programs that enable a user to create, edit, manage, and perform "presentations" on a computer. One example of a popular slide presentation program is Microsoft PowerPoint.RTM., available from Microsoft Corporation, of Redmond, Washington. Another powerful presentation tool is Lotus Freelance. A slide presentation includes a set of electronic "slides," each slide corresponding to one screen or page of output. An electronic slide may also be converted to a 35 mm slide or overhead transparency and displayed in a standard slide projector or overhead projector. Each slide contains one or more objects, such as text, graphical images, or graphical animation. A slide may also include a sound object that is played when the slide is displayed during a "slide show" performance.

A slide presentation program performs a slide show by sequentially displaying a series of slides contained within the slide presentation. The slides are displayed on a display screen, which may be part of a computer monitor or a separate surface onto which an image is projected. During a performance of a slide show, a speaker controls the performance by invoking commands to advance the slide show. A command to the slide presentation program can be entered using a keyboard, a mouse, or other suitable input device. Alternatively, an author of a slide presentation can include slide "timings" with each slide. A slide timing corresponding to a slide indicates the number of seconds that the slide is displayed before the slide presentation program automatically advances to the next slide. During a performance of a slide show, the slide presentation program automatically advances to the next slide when the existing slide's timing ends.

A slide can include one or more display objects that are incrementally displayed during a slide show. For example, a slide may initially appear with one bullet item. Sequential advancement of the slide show causes additional bullet items to be displayed. Display objects, such as bullet items, that are incrementally displayed are referred to as "builds." Builds ??

Presentation program resources have been developed to aid a user in developing a slide presentation. Each slide presentation contains a number of slides that display information, such as text, to an audience. In addition, each slide presentation can contain links to data (linked data) stored in an external source, such as a spreadsheet. The external source is referred to as a link source.

A link contains both a representation of the linked data and a reference to the linked data. The representation contains a static snapshot of the linked data, and as such, the representation must be updated periodically to reflect changes made to the linked data. Accessing the linked data via the reference to retrieve the latest version of the linked data performs an update. The representation is a pictorial representation, like a bitmap that describes a screen graphic, of how the linked data appeared on the computer display as of the last time the representation was updated. For example, when the linked data is a range of spreadsheet cells, the representation of the linked data would be the actual graphical depiction of the range of spreadsheet cells as it appears on the computer display. An example of a reference to linked data is a file name with a path and an indication of the specific linked data within the file. For example, the reference "C:.backslash.spreadsheets.backslash.financial.xls|A1:F1" indicates that the linked data comprises the cells "A1:F1" in the spreadsheet with the file name "financial.xls" at path "C:.backslash.spreadsheets." When the representation is displayed, the representation is displayed to the audience as an integrated part of the presentation.

Computer programs often have associated data files that are processed by the computer program during a normal execution of the computer program. A data file can contain information that is processed and presented to a user either in a video presentation or an audio presentation, or a combination of video and audio. Slide presentation programs are examples of computer programs that process an associated data file.

Many times there is a need to modify or update a presentation slide. There may be new information related to the particular subject matter in the slide. In some instances, the audience may require the presentation of the information in a slightly different manner. For many companies, there may be need to present information contained on a presentation to an audience that speaks a different language from the original language contained in the slide. This language difference is becoming a more important issue in the business world.

Multi-national corporations conduct business throughout the world and in various languages. As a result, it is often necessary to communicate information generated in one language to persons in a second language. Therefore, a translation of the information has to occur at some point in the communication process. Because of the use of multiple languages in many business environments, many software application programs are developed with the intent that they will be used in a global economy, particularly in a network communication environment. In this environment, the network users can be located throughout the world. In order to increase business opportunities between companies and to enable the international users of the computer software resources to efficiently interact, the graphical interfaces/screen displays of the program may need to appear in the language of the foreign user. Various methods have been proposed for translating computer software resources. However, such methods can be expensive and time consuming, as it may be necessary to change the code of the software program. Moreover, such modifications may not be feasible, as the user may not have access to the program code. Thus, it is desirable to have a tool that enables the user to translate the graphical interfaces/screen displays of a software program without the need to modify or otherwise interact with the program code.

In response to the desire to translate slides, there have been some methods developed for translating the graphical user interface/screen displays without modification to the underlying application program. One method, described in U.S. Pat. No. 5,974,372 issued to Barnes et al, enables the user of the program to select screen displays for translation, gather the original text from the screen display, enter the equivalent foreign language and store the associated basic and foreign texts in memory for subsequent recall and use. In operation, this method stores original and various translated versions of a specific text in a table. Upon subsequent operation of the application program the message, which forms the screen to be displayed, will be intercepted. Subsequently, a search of the translation table for the text in the intercepted message is conducted. The matched text is replaced with the second language previously entered in the translation table. The translated message is then forwarded for display on the terminal screen. The method can either translate all designated application screens upon start up of the application program or can be individually translated as they appear on the terminal screen. Moreover, selectable words from selectable screen displays as well as selectable sub-screen displays associated therewith can be translated. Accordingly, one or more screen displays in the software program can be translated into one or more foreign languages according to the desires of the program user. In another slide translation method, text from a presentation slide is highlighted/selected and translated using translation programs. However, with this method, it may be necessary to repeat the translation process several times for one slide of a slide presentation when the slide has various groups of text on the slide.

In addition to the aforementioned tedious task of bit-by-bit translation of text, another problem with translating text in presentation slides is that the images in the slide may get repositioned in the slide during the re-insertion of the translated text into the slide. This situation can be problematic if the text space conflicts or overlaps the image space on the slide. Without adequate information about the proper positioning of the images on the slide, this translated text or slide image can be out of position with reference to the original presentation slide.

It is desirable to have a method that can translate presentation slide information from one language to a second language in an efficient and accurate and cost-effective manner. It is also desirable to have a slide translation method that can translate text from a presentation slide without concern about the proper positioning of the translated text in a translated version of an original slide presentation.

SUMMARY OF THE INVENTION

It is an objective of the present invention to provide a method and system to translate text in a screen display and in particular a presentation slides from one language to another language.

It is a second objective of the present invention to provide a method and system that translate text from a presentation slide from one language to at least one different language and maintain the configuration of the original presentation slide on the newly translated slide.

It is a third objective of the present invention to provide a method that can translate the text of the original presentation slide without translating slide addressing information located on the original slide.

It is a fourth objective of the present invention to provide a translation method that can read the text of a presentation slide with reading the slide addressing information.

It is a fifth objective of the present invention to provide an auxiliary file to be used during the slide translation process.

It is a sixth objective of the present invention to provide a method for extracting text information from a presentation slide and inserting the translated text into a second presentation slide in a different.

It is a seventh objective of the present invention to provide a method for performing semi-automatic re-translation of updates when portions of text in a presentation slide but not all text in the slide has been modified.

The present invention provides a method and system for translating presentation slides from one language to at least a second language without the need to perform long and cumbersome manual processes as is currently done to translate presentation slides. In the method of the present invention, the first step is to create a copy of an original slide presentation. This method also creates and auxiliary file that will be used during the actual text translation process. One type of auxiliary file could be a Microsoft Word file. Existing translation programs can readily translate the text in a WORD document format. The next step, in the process of this invention, reads all of the text from the copy of the original slide presentation. For each set of text read from the original presentation file copy, a text entity is created in the auxiliary file. Simultaneously, addressing information for the text entity is stored in the auxiliary file as a "comment" to the text entity. However, the addressing information is transparent and write-protected from the translating program and therefore will only pass through without being translated. Following the translation procedure, the translated text information is written onto the copy of the original presentation slide in the locations of the originally read text from that file. As mentioned, the text is written onto the slide in accordance with the addressing information contained in the comments that were transferred with the text information to ensure that the text is properly positioned on the slide.

Also the present invention provides the capability to obtain semi-automatic retranslation of updates of presentation slides. When portions of text but not all text in a presentation have been modified modern translation tools will provide automatic retranslate all non-modified text strings.

The translated slide presentation can reside on the same computing machine as the original presentation slide or the translated slide can be transferred as part of the translation process to a new destination. This new destination can be a remote computing device such as a personal computer, a server, a router, a network PC, a peer device or other common network node. The transfer of a translated presentation slide

DETAILED DESCRIPTION OF THE INVENTION

Figure 1:
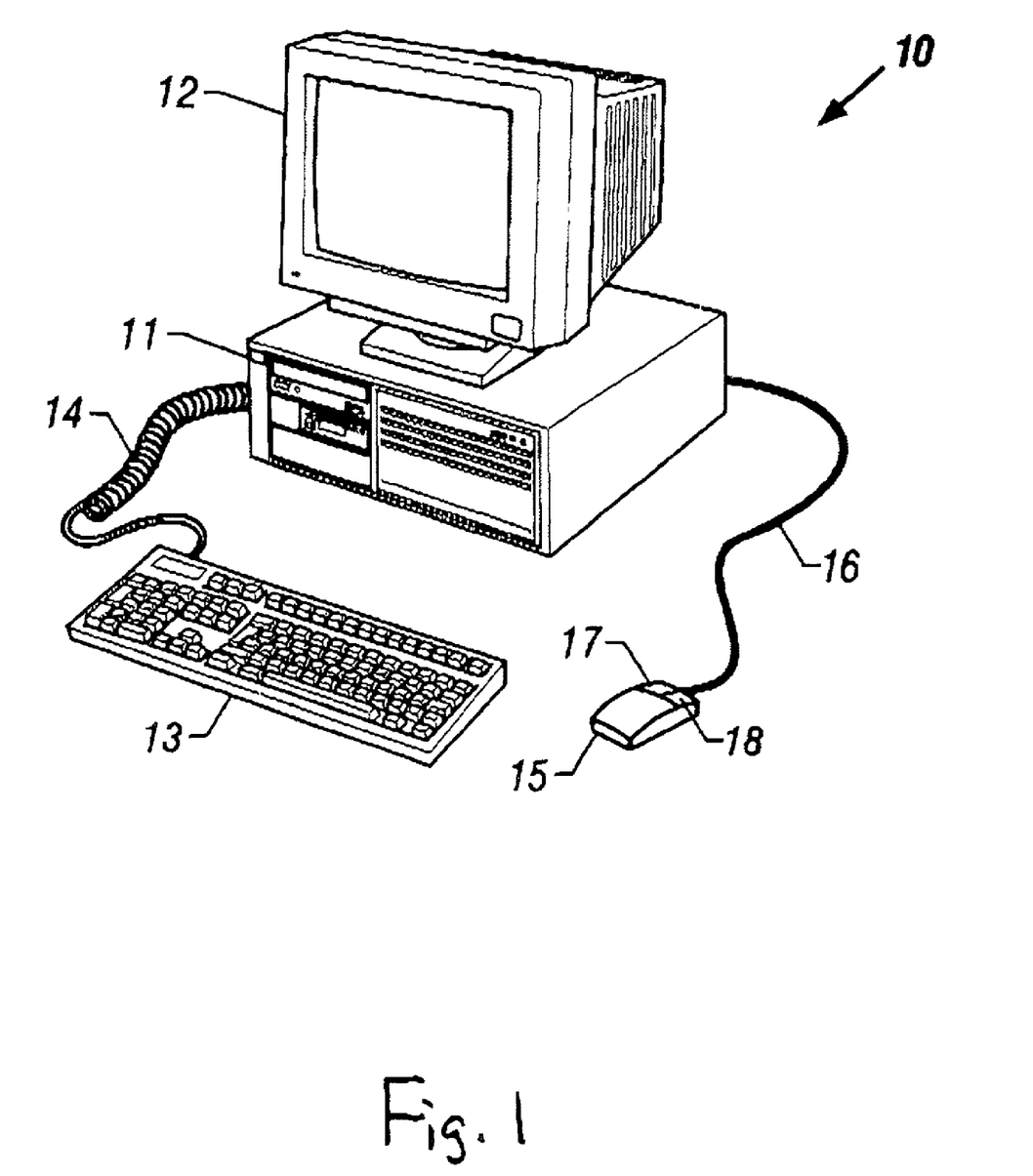
FIG. 1 depicts data processing equipment a system that can be utilized to implement the present invention.

In accordance with the present invention, a slide presentation program executes on a computer, preferably a general-purpose personal computer. FIG. 1 and the following discussion are intended to provide a brief, general description of a suitable computing environment in which the invention may be implemented. With reference now to FIG. 1, there is depicted a pictorial representation of data processing system 10 which may be used in implementation of the present invention. As may be seen, data processing system 10 includes processor 11 that preferably includes a graphics processor, memory device and central processor (not shown). Coupled to processor 11 is video display 12 which may be implemented utilizing either a color or monochromatic monitor, in a manner well known in the art. Also coupled to processor 11 is keyboard 13. Keyboard 13 preferably comprises a standard computer keyboard, which is coupled to the processor by means of cable 14. Also coupled to processor 11 is a graphical pointing device, such as mouse 15. Mouse 15 is coupled to processor 11, in a manner well known in the art, via cable 16. As is shown, mouse 15 may include left button 17, and right button 18, each of which may be depressed, or "clicked", to provide command and control signals to data processing system 10. While the disclosed embodiment of the present invention utilizes a mouse, those skilled in the art will appreciate that any graphical pointing device such as a light pen or touch sensitive screen may be utilized to implement the method and apparatus of the present invention. Upon reference to the foregoing, those skilled in the art will appreciate that data processing system 10 may be implemented utilizing a personal computer.

Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The personal computer may operate in a networked environment using logical connections to one or more remote computers, such as a remote computer. The remote computer may be another personal computer, a server, a router, a network PC, a peer device or other common network node, and typically includes many or all of the elements relative to a conventional personal computer. The logical connections depicted include a local area network (LAN) and a wide area network (WAN), Such networking environments are commonplace in offices, enterprise-wide computer networks, intranets and the Internet.

As mentioned, the method of the present invention may be implemented in a global computer network environment such as the Internet. With reference now FIG. 2, there is depicted a pictorial representation of a distributed computer network environment 20 in which one may implement the method and system of the present invention. As may be seen, distributed data processing system 20 may include a plurality of networks, such as Local Area Networks (LAN) 21 and 22, each of which preferably includes a plurality of individual computers 23 and 24, respectively. Of course, those skilled in the art will appreciate that a plurality of Intelligent Work Stations (IWS) coupled to a host processor may be utilized for each such network. Any of the processing systems may also be connected to the Internet as shown. As is common in such data processing systems, each individual computer may be coupled to a storage device 25 and/or a printer/output device 26. One or more such storage devices 25 may be utilized, in accordance with the method of the present invention, to store the various data objects or documents which may be periodically accessed and processed by a user within distributed data processing system 20, in accordance with the method and system of the present invention. In a manner well known in the prior art, each such data processing procedure or document may be stored within a storage device 25 which is associated with a Resource Manager or Library Service, which is responsible for maintaining and updating all resource objects associated therewith.

Figure 2:
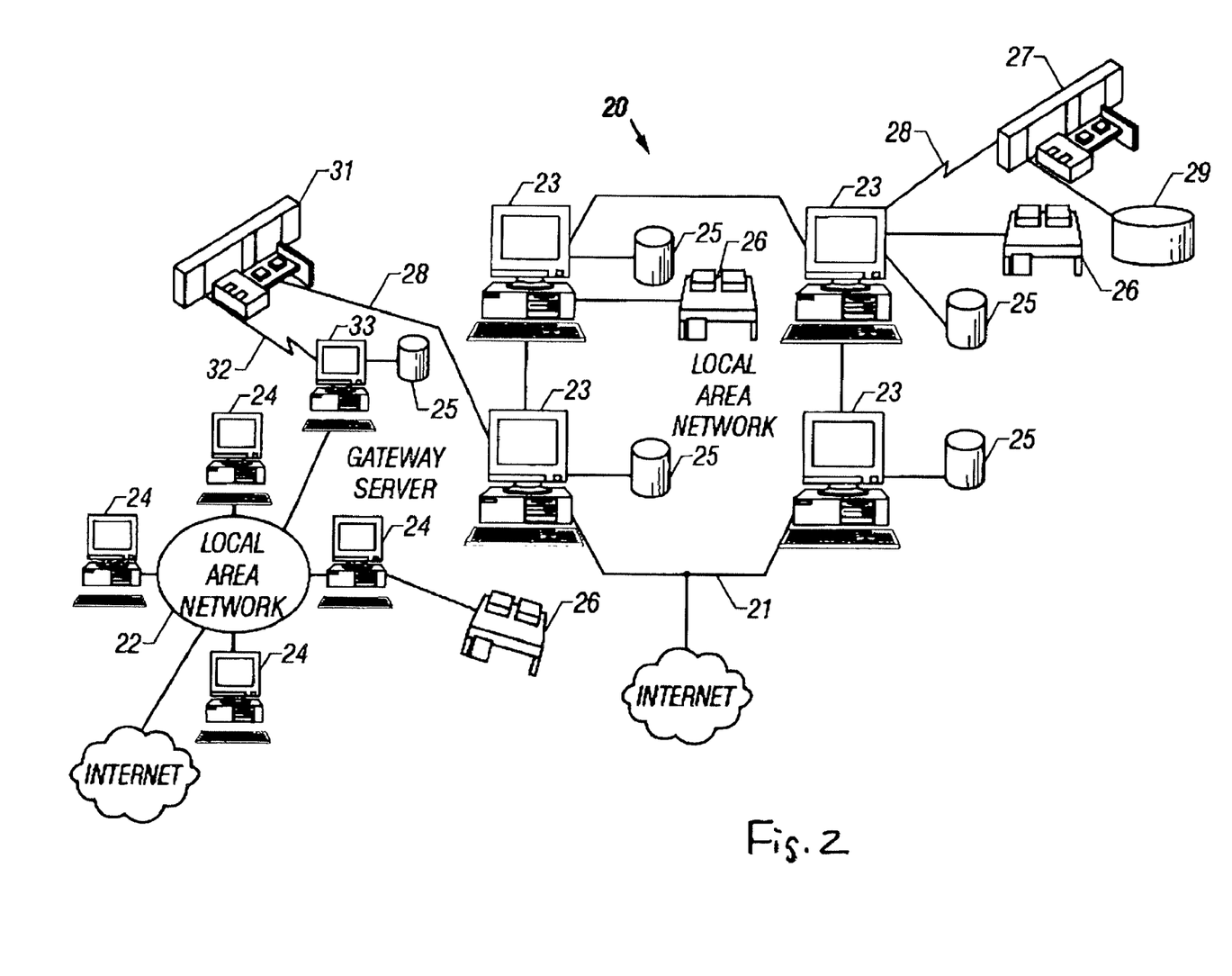
FIG. 2 is a diagram of a computer network over which messages and transactions may be transmitted.

Still referring to FIG. 2, it may be seen that distributed data processing system 20 may also include multiple mainframe computers, such as mainframe computer 27, which may be preferably coupled to Local Area Network (LAN) 21 by means of communications link 28. Mainframe computer 27 may also be coupled to a storage device 29 which may serve as remote storage for Local Area Network (LAN) 21. A second Local Area Network (LAN) 22 may be coupled to Local Area Network (LAN) 21 via communications controller 31 and communications link 32 to a gateway server 33. Gateway server 33 is preferably an individual computer or Intelligent Work Station (IWS) that serves to link Local Area Network (LAN) 22 to Local Area Network (LAN) 21. As discussed above with respect to Local Area Network (LAN) 22 and Local Area Network (LAN) 21, a plurality of data processing procedures or documents may be stored within storage device 29 and controlled by mainframe computer 27, as Resource Manager or Library Service for the data processing procedures and documents thus stored. Of course, those skilled in the art will appreciate that mainframe computer 27 may be located a great geographical distance from Local Area Network (LAN) 21 and similarly Local Area Network (LAN) 21 may be located a substantial distance from Local Area Network (LAN) 24. That is, Local Area Network (LAN) 24 may be located in California while Local Area Network (LAN) 21 may be located within Texas and mainframe computer 27 may be located in New York.

Figure 3:
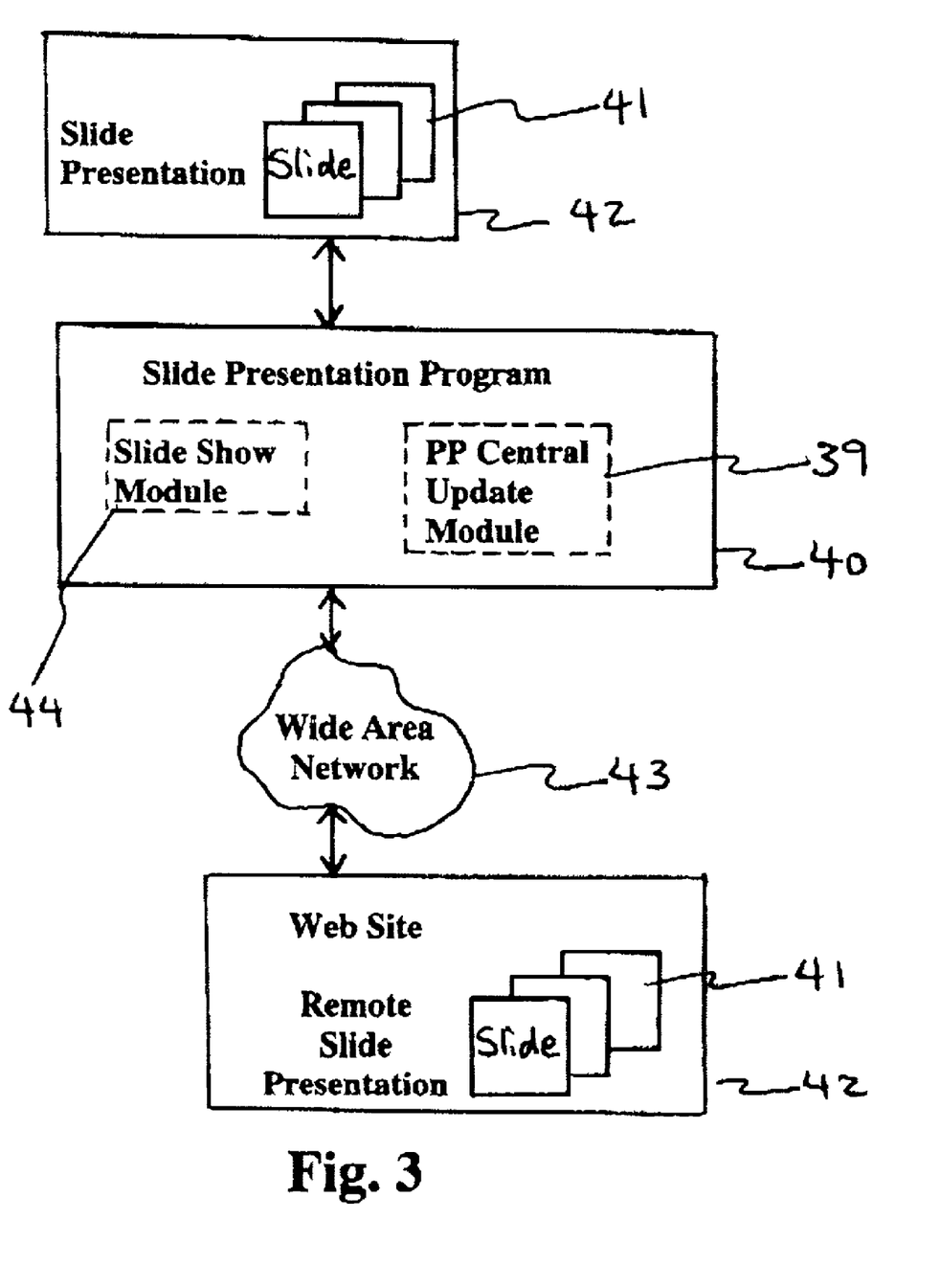
FIG. 3 is a block diagram illustrating an architecture of a conventional slide presentation program.

FIG. 3 illustrates an architecture of a slide presentation program 40 that can be used in the present invention. A slide is a discreet collection of information, including visual information such as text, graphic images, video, or animation. A slide may also comprise other information, including sounds and interactive information, such as hyperlinks. The slide presentation program 40 provides an author with the ability to create and edit a set of one or more "slides" 41 and to "present" or display one or more of the set of slides. The set of slides is referred to as a "slide presentation" 42. A slide presentation 42 is generally stored on a computer storage medium, such as a disk drive. The computer storage medium may be directly connected to the computer that performs a slideshow, or it may be connected to a remote computer on a local area network (LAN) or a wide area network (WAN) 43, such as the Internet.

The slide presentation program 40 includes a slide show module 44 that contains program code for controlling an electronic slide show. During an electronic slide show, the slide show module 44 retrieves a slide 41 and displays the slide on an output medium, such as a display monitor. The slide presentation program 40 also includes a PPCentral update module 39 that controls updating of the Central slide presentation 42. The techniques and features of the present invention could be located in the Central update module 39. As shown in FIG. 3, the slide presentation program 40 can interact with multiple slide presentations.

Figure 4:
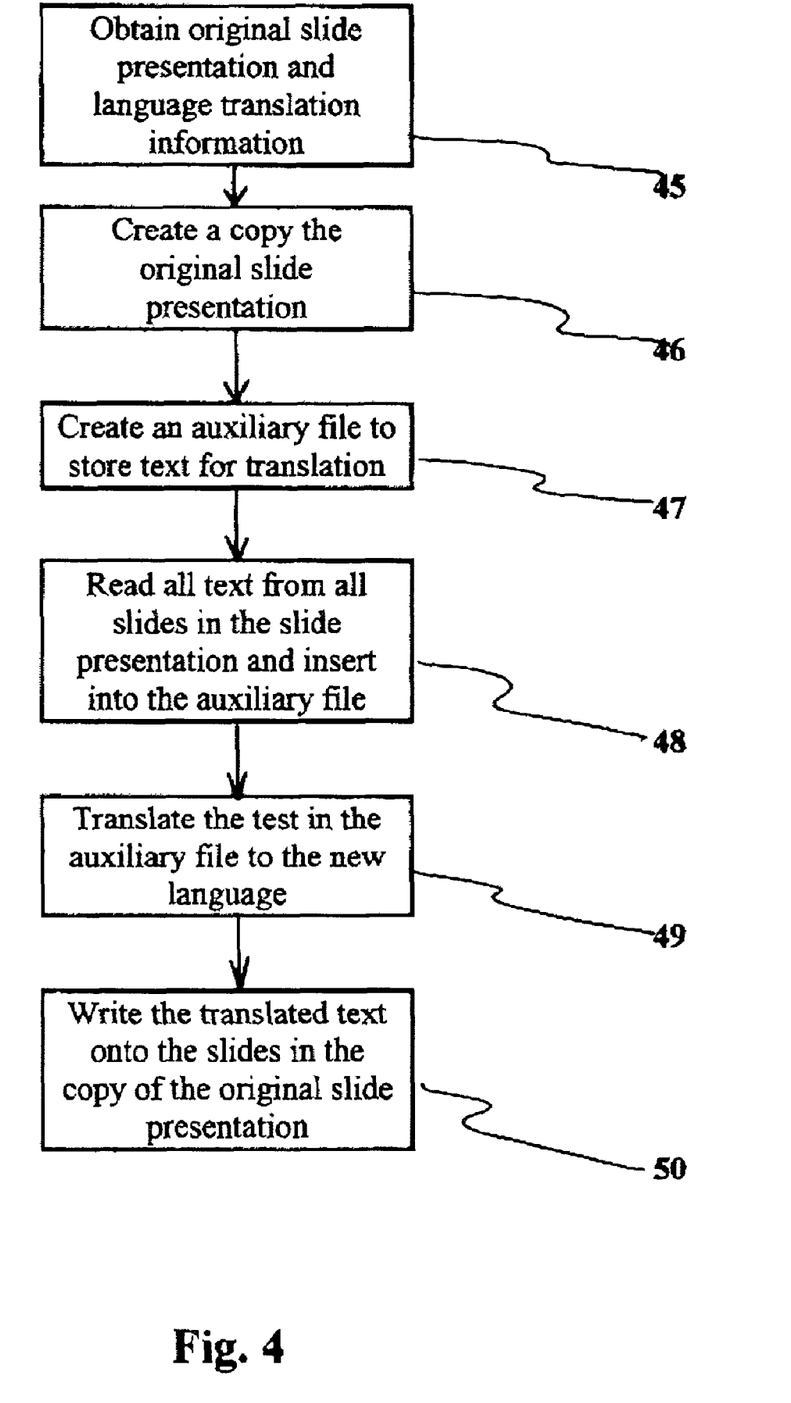
FIG. 4 is a flow diagram of the steps for the implementation of the method of the present invention.

FIG. 4 illustrates a flow diagram of the preferred method of the present invention. This preferred method is implemented as a batch process, using batch-processing software. Prior to invoking this method, the user will supply information about the identity of the slide presentation that the user wants to translate to a new language. The user also indicates the new language in which the slide presentation will appear. The user can also indicate the current language of the original slide. The slide presentation can contain any number of slides. After supplying this information, the user can then invoke the method of the present invention to perform the slide translation. In the initial step of the invention, 45, the method gathers information supplied by the user about the identity of the original slide presentation and the original and translation languages for the slide presentation. In step 46, the method creates a copy of the original slide presentation. After creating this copy of the slide presentation, the next step, 47, is to create an auxiliary file. This file may be a WORD document file and will be used to store the text that will be translated from the original slide presentation language to the new presentation language. After the creation of the auxiliary slide, in step 48 the method reads the text from the original slide presentation and writes this text into the auxiliary file. This method can also read this information from the copied presentation. It is important to note that in this step all of the text from the original slide presentation is read into the auxiliary file. This text includes all text that is contained in any objects or group of objects in the slide presentation.

Referring to FIG. 4, after all text information is read into the auxiliary file, the text is then translated into the new language as indicated in step 49. At this point, the newly translated text is written back onto the copy of the original slide presentation. In this step 50, the method uses the information in the comment field for each text object to write that text back to exact location of the original version of that text. This writes over the original text in the original presentation copy file and thereby displays the desired translated version of that text. Because the translated text is placed in the file using the information in the comment field of the auxiliary file, the insertion of this new text does not effect the positioning of any objects in that same slide presentation. As previously mentioned, the effect on the objects in a presentation slide during the insertion of the translated text was a major concern with previous slide translation methods.

Referring to step 48, this process of getting the text into the auxiliary file is known as recursion. The recursion process is necessary in order to get all of the text that is in the slide presentation into the auxiliary file. The process of getting text out from a slide presentation into an auxiliary file is non-trivial. Presentation software modules have the ability to group objects on slides. A group is two or more objects on a particular slide of a presentation. Groups can comprise different types of objects. A slide may have several images and text areas. Slide presentation software represents each image and text area on a slide as an object. Text can be grouped with images. Groups can be grouped with other groups and other objects in large hierarchies. Recursion is necessary to find all text on a particular slide. A recursion program is a program that calls itself. The recursion program searches a group for text. During the search the recursion program may discover a sub-group that must be searched and so on.

Figure 7:
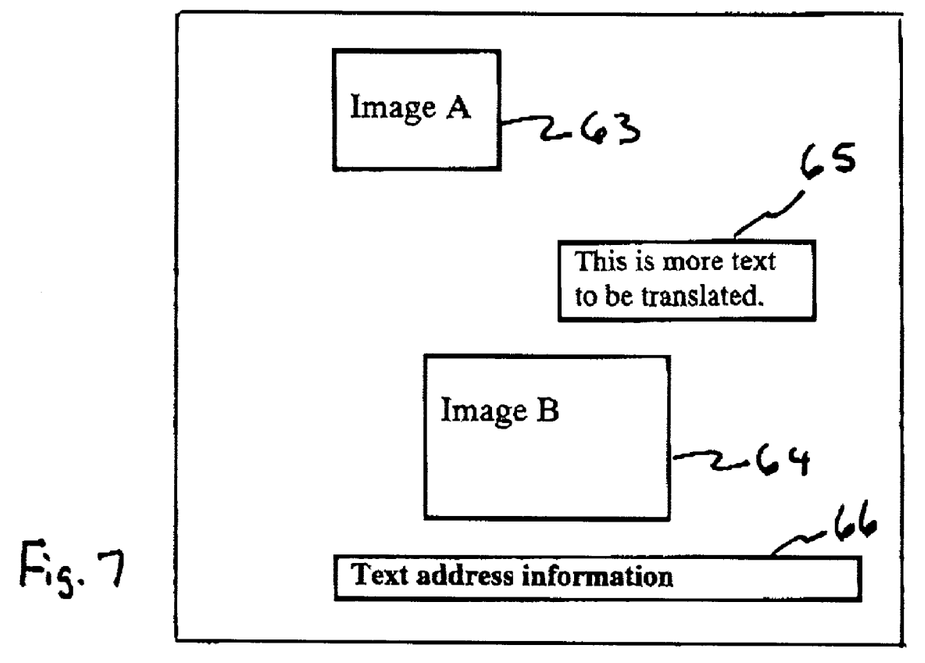
FIG. 7 is a sample presentation slide containing text and text addressing information before the slide translation process of the present invention.

Referring to FIG. 7, there may be text on images (groups of objects) 63 and 64 as well as the text 65. Each image and the text are objects. In addition, image A 61 and Image B 64 may also be groups of objects. If each image contained text, the text on each image would also be a separate object. As mentioned, these groups can have both text and images. In an example of object grouping, a user has a photograph in PowerPoint. The user adds a caption in plain text. The user positions the photograph and the caption mutually together. Then the user groups them together because the user always wants the photograph and caption to stay together regardless of where they are going to be positioned on the screen. The user then enters a text paragraph related to the photo/caption. The user also wants the paragraph to always stay together with the photo/caption. So now the user has a hierarchy of objects: 1) A paragraph and a group; and 2) The group is a photo and a caption.

Figure 5:
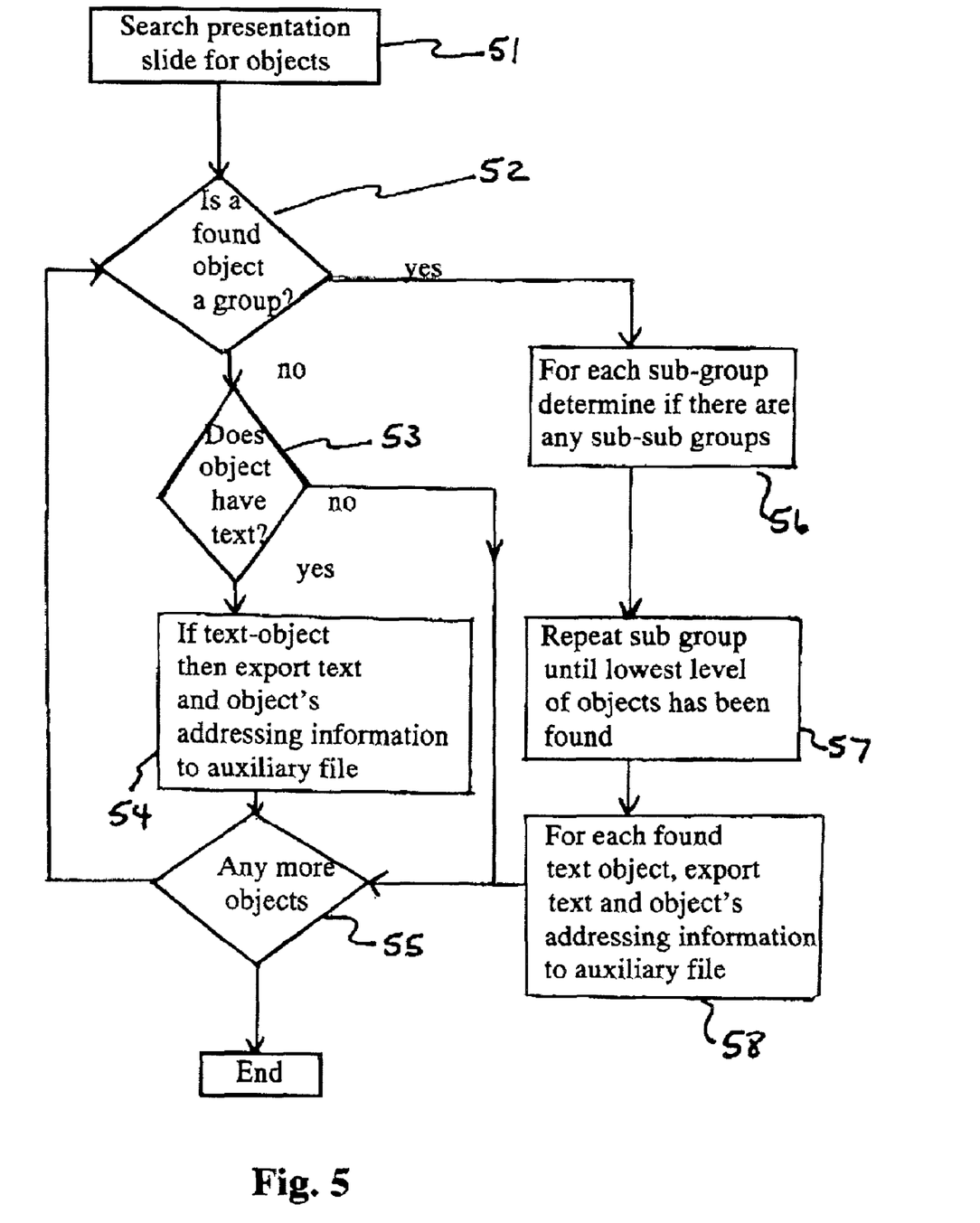
FIG. 5 is a flow diagram of the recursion process for extracting text from a presentation slide.

During the recursion process, the recursion program searches a group of objects for text. FIG. 5 is an illustration of the steps in the recursion process for extracting text from a presentation slide. The first step 51 is to search for and identify an object on the slide. The next step 52 is to determine whether the object is a group. If it is not a group, then there is a determination of whether the object has text 53. If the object does contain text, then step 54 exports the text and the object's addressing information to the auxiliary file. If the object does not contain text, the method moves to step 5 and searches for additional objects on the slide. In step 52, if the object is a group, the process moves to step 56 where for each sub-object in the group, there is a determination of additional subgroups. If there are additional sub-groups, step 57 continues to search for sub-groups until the lowest level of objects is found. For each text object found in step 57, step 58 exports the found text and object's addressing information to the auxiliary file. At this point, the process returns to step 55 and the process repeats for the remainder of the slide presentation. The process continues to search for more objects on the slide 55 and returns to 52 if more objects are on this slide. If there are no more objects on a slide, the process for that slide terminates. The process repeats steps 52 through 55 for each object on the slide.

In the present FIG. 7, the recursion program would read the text 65, but would also search images (groups objects) 63 and 64 to determine if either image contained text. If one image does contain text, the recursion would also ready that text. Each text entity that is read into the auxiliary file would also cause a comment string to be generated. This comment string would contain important information about the location of the text entity on that particular slide.

Figure 6:
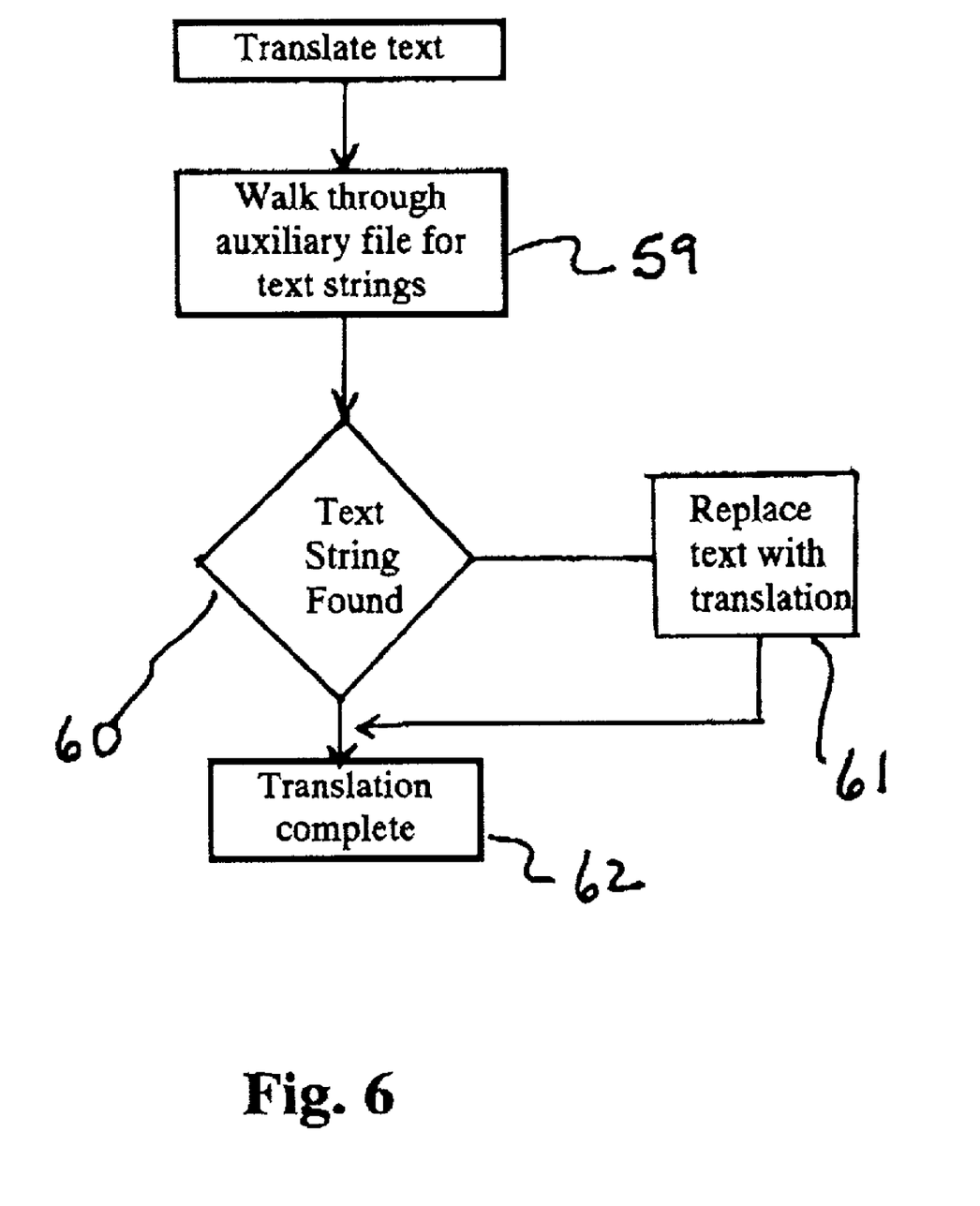
FIG. 6 is a flow diagram of the steps involved in the actual translation of the text in a slide.

FIG. 6 shows the steps involved in the actual translation of text that occurs in step 49. In the translation process, the text to be translated is extracted from the auxiliary file and read by the translation program. This extracted text is translated by a routine wherein the auxiliary file is searched at 59 for translation strings.-For each string found in the file 60, the text is manually overtyped or if previously translated automatically replaced with the translation at 61. At this point the translation of that string of text is complete. The translation routine then retrieves another string of text and repeats the steps in the translation. When all strings in the auxiliary file are translated the translation of the presentation is complete 62. The translation means for the text in the presentation can be one of the existing translation programs used to translate text.

Following the translation of the presentation slide into the second language, the translated slide can be stored in a presentation slide database for use at future times. The presentation slide file can contain a link to the originating file. If there is a desire to translate the original slide to a second language, the slide database for that language can be searched for an existing slide that is a translation of an original slide in another language. The original presentation slide can also have links to each slide that is a translation of the original slide. The implementation of a translated presentation slide identification, storage and retrieval can reduce the amount of side creation and duplication.

FIG. 7 is an example of a presentation slide before the translation process. As shown, the slide has both images (or groups of objects) 63 and 64 and text 65. The slide also has a text address information field 66. Because of the presence of both images and text, it is very important to maintain the accuracy of the addressing information. As previously mentioned, this information will enable the images and text to be properly positioned in the new translated slide such that the new slide is the same as the original with the exception of translated text. Although FIG. 6 shows the address information field, this field is not seen or read by the translation program.

Figure 8:
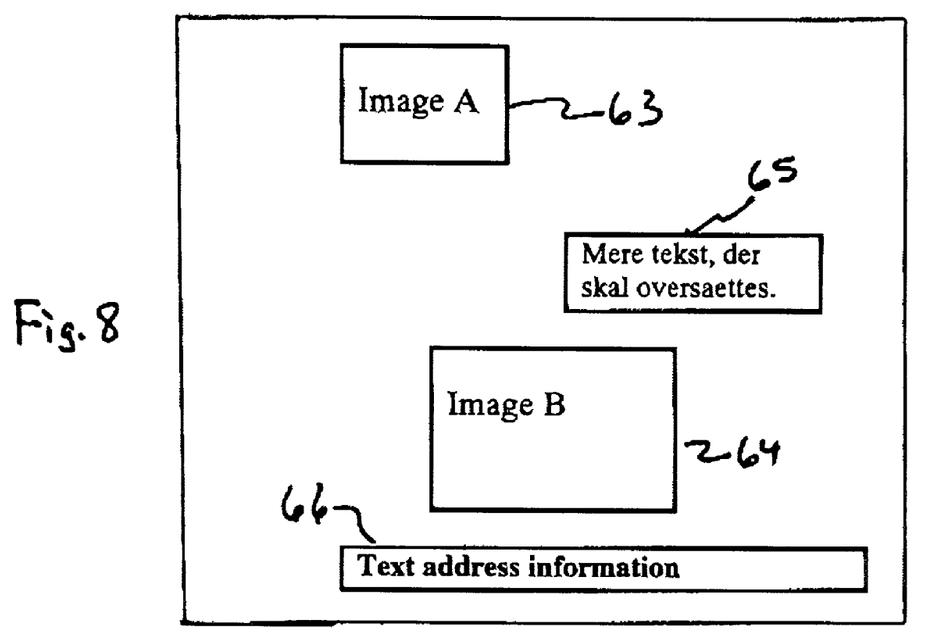
FIG. 8 is a sample presentation slide containing translated text and text addressing information after the slide translation process of the present invention.
Figure 9:
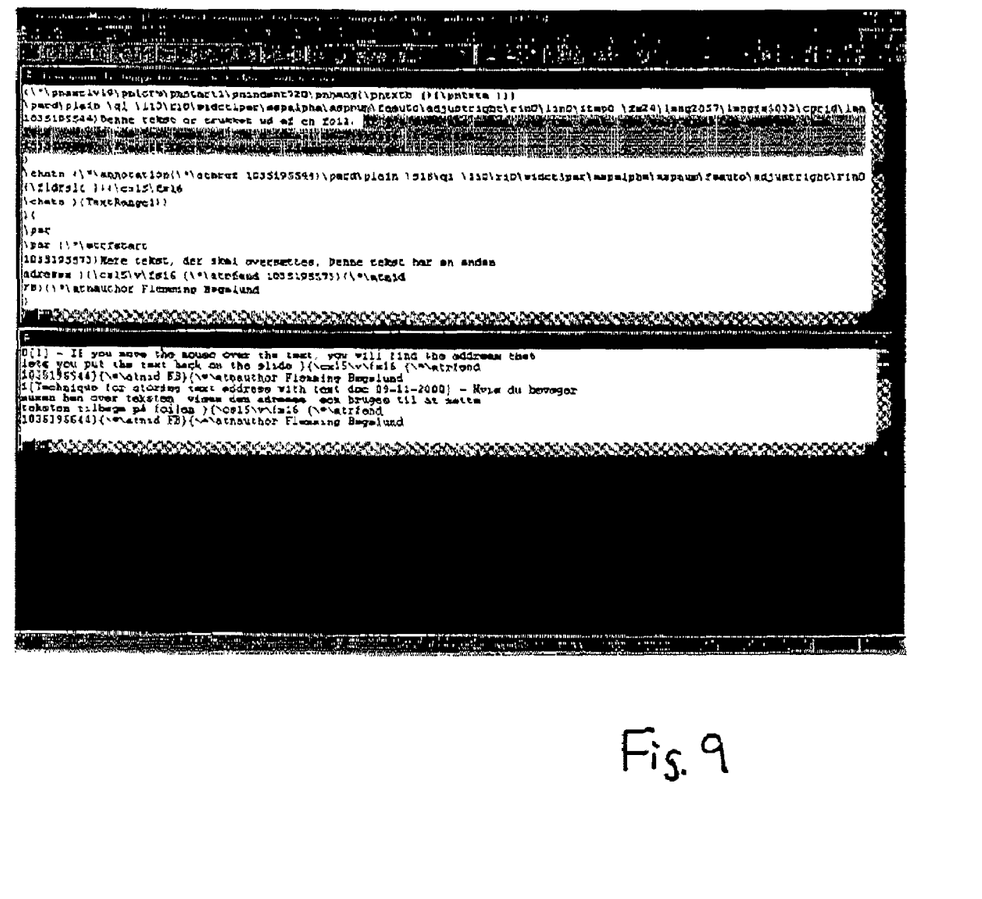
FIG. 9 is a screen display of a translation tool showing the extracted presentation slide text in the auxiliary file before translation.

FIG. 8 shows the presentation slide of FIG. 7 with the text translated from English to Danish. As shown, the images 63 and 64 are in the same position in FIG. 8 as they were before the translation in FIG. 7. The translated text 65 is also in the same position as in the previous slide. FIG. 9 shows an actual translation tool screen before translation of an auxiliary file.

It is important to note that while the present invention has been described in the context of a fully functioning data processing system, those skilled in the art will appreciate that the processes of the present invention are capable of being distributed in the form of instructions in a computer readable medium and a variety of other forms, regardless of the particular type of medium used to carry out the distribution. Examples of computer readable media include media such as EPROM, ROM, tape, paper, floppy disc, hard disk drive, RAM, and CD-ROMs.

Having thus described the invention, what we claims as new and desire to secure by Letters Patent is set forth in the following claims.

We claim:

1. A computer implemented method for translating text on an original slide presentation from a first language to a second language in a batch process comprising the steps of:
   obtaining original slide presentation and language translation information, during a batch processing session;
   creating a text file, the text file having a format that can enable text be translated from one language to a second language using conventional file translation techniques by obtaining the original presentation slide for which translation is desired, obtaining the translation language for the presentation slide; and retrieving the text to be translated from the original presentation slide;
   reading all text from all slides in the slide presentation;
   inserting the read text from an original presentation slide into the created auxiliary text file;
   translating the text inserted into the auxiliary text file from a first language to a second language; and
   writing the translated text onto the original presentation slide, in the location of the original text that was translated, using information contained in the original presentation slide.

2. The method as described in claim 1 wherein said addressing information related to the configuration of the objects contained in the original presentation slide is inserted into the created text file, at a location transparent to a user.

3. The method as described in claim 2 wherein the addressing information is extracted from the original presentation slide.

4. The method as described in claim 2 wherein said translated presentation slide writing step comprises:
   creating a copy of the original presentation slide;
   retrieving the translated text information from the new text file;
   retrieving other slide presentation information from the original presentation slide; and
   inserting the translated text information and the other presentation slide information onto the created copy of the original presentation slide such that the inserted information appears in the copy of the original slide in the same configuration as in the original presentation slide.

5. The method as described in claim 4 wherein said insertion step comprises inserting and positioning said translated text and other original presentation information in the copy of the original presentation slide according to the addressing information for the original slide.

6. The method as described in claim 1 wherein said text-retrieving step comprises reading the text from the original presentation slide.

7. The method as described in claim 1 wherein said text-retrieving step comprises copying the text from the original presentation slide.

8. The method as described in claim 1 wherein said text-retrieving step comprises:
   searching the slide presentation for objects;
   determining whether a found object is a text object; and
   exporting the text from the found text object and the found object's addressing information to the created text file.

9. The method as described in claim 8 further comprising the steps of:
   determining whether the found object is a group;
   searching each sub-object in a determined group for text;
   exporting the text from each sub-object found in the group; and repeating said searching and exporting steps for each sub-object determined to be in the determined group.

10. The method as described in claim 8 wherein a slide is searched until the lowest level object on that slide is detected.

11. The method as described in claim 1 wherein the addressing information contained in the text file is not translated from the first language to the second language.

12. The method as described in claim 1 further comprising during a batch processing session the steps of:
   creating a specific identification for the new translated presentation slide;
   attaching a link from the new translated slide to the original presentation slide; and
   storing the translated presentation slide in a translated slide database for the second language.

13. The method as described in claim 12 further comprising before said new text file creation step, the step of examining links of an original presentation slide to determine if a translated slide for the particular language currently exists and retrieving an existing translated slide.

14. A computer implemented method for translating text on a presentation slide from a first language to a second language comprising in a batch process the steps of:
   creating a copy of an original presentation slide from an original presentation slide during a batch processing session;
   obtaining the original presentation slide for which translation is desired;
   obtaining the translation language for the presentation slide;
   retrieving the text to be translated from the original presentation slide;
   creating a text file, the text file having a format that can enable text be translated from one language to a second language using conventional file translation techniques by obtaining the original presentation slide for which translation is desired, obtaining the translation language for the presentation slide; and retrieving the text to be translated from the original presentation slide;
   inserting text from the copy of an original presentation slide into the created text file;
   translating the text inserted into the text file from a first language to a second language; and
   writing the translated text onto the created copy of the original presentation slide, in the location of the original text that was translated, using information contained in the original presentation slide.

15. The method as described in claim 14 wherein said translated presentation slide writing step comprises:
   retrieving the translated text information from the new text file; and
   inserting the translated text information onto the created copy of the original presentation slide such that the inserted information appears in the copy of the original slide in the same configuration as in the original presentation slide.

16. The method as described in claim 14 further comprising the steps of:
   creating a specific identification for the new translated presentation slide;
   attaching a link from the new translated slide to the original presentation slide; and
   storing the translated presentation slide in a translated slide database for the second language.

17. The method as described in claim 16 further comprising before said new text file creation step, the step of examining links of an original presentation slide to determine if a translated slide for the particular language currently exists and retrieving an existing translated slide.

18. A computer program product implemented in a computer readable medium for translating text on an original slide presentation from a first language to a second language during a batch process comprising:
   obtaining original slide presentation and language translation information, during a batch processing session:
   creating a text file, the text file having a format that can enable text be translated from one language to a second language using conventional file translation techniques by obtaining the original presentation slide for which translation is desired, obtaining the translation language for the presentation slide; and retrieving the text to be translated from the original presentation slide;
   reading all text from all slides in the slide presentation;
   inserting the read text from an original presentation slide into the created auxiliary text file;
   translating the text inserted into the auxiliary text file from a first language to a second language; and
   writing the translated text onto the original presentation slide, in the location of the original text that was translated, using information contained in the original presentation slide.

* * * * *